July 14, 1953 — J. N. GLADDEN — 2,645,451
VALVE STRUCTURE
Filed Aug. 11, 1947
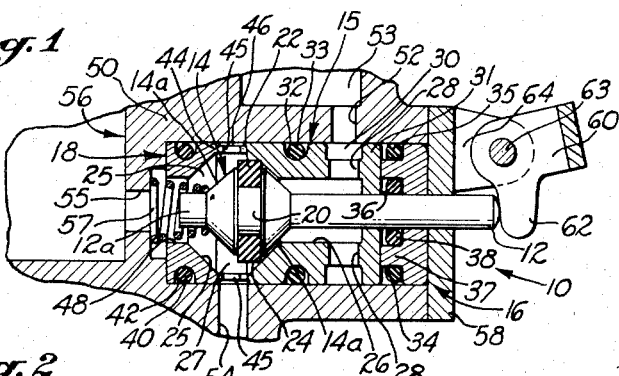
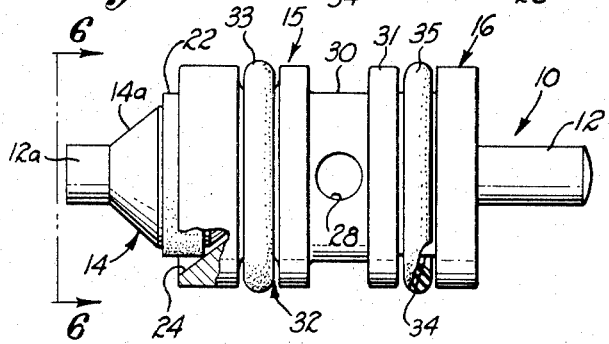
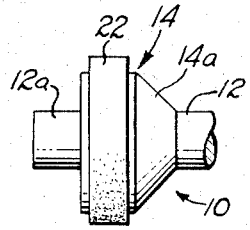
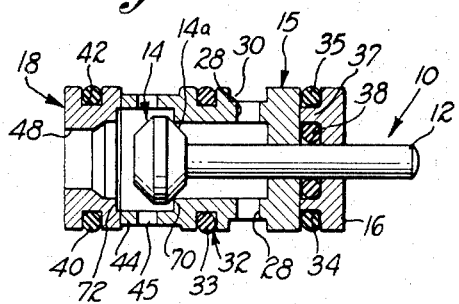
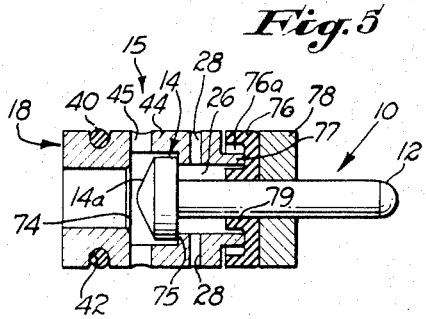
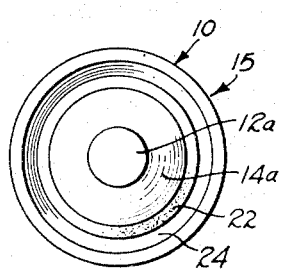
INVENTOR:
JOHN N. GLADDEN
BY HIS ATTORNEYS
HARRIS, KIECH, FOSTER & HARRIS Patented July 14, 1953

2,645,451

UNITED STATES PATENT OFFICE 2,645,451

VALVE STRUCTURE

John N. Gladden, Glendale, Calif.

Application August 11, 1947, Serial No. 768,018

4 Claims. (Cl. 251—118)

This invention relates to valves adapted for the control of fluids, particularly hydraulic liquids employed in such structures as hydraulic brake systems, and it is especially adapted to three-way valve controls.

In one type of brake system, a power chamber is employed which is connected through a suitable operating passage to individual braking mechanisms, and a pedal-controlled piston is used in the power chamber to create required pressures. To keep the brakes continuously applied while the vehicle upon which they are carried is parked, some provision is made for locking or latching the system after application of the brakes. In addition, an accumulator chamber is used in such systems, this accumulator chamber also applying pressure as through the medium of a spring-loaded piston. To control the different pressures exerted from the power chamber, the brake mechanism, and the accumulator chamber under various operating conditions, a special valve is required. Such a valve is the subject of this invention.

An important object of this invention is to provide a valve mechanism capable of properly controlling the various hydraulic pressures exerted through corresponding ports from the parts of the braking system above mentioned.

Another object is to provide valve means which may be employed for normally isolating the accumulator chamber of such a braking system from both the power chamber and the operating passage leading to the brake mechanism, and also for automatically placing the accumulator chamber in communication with such operating passage whenever the brakes are to be locked in parking position.

Other objects of this invention include the following: To provide a three-way valve for a system such as mentioned which is movable between a first or non-parking position which will also be called the normal position, and a second or parking position which also may be called the closed position; to provide a three-way valve such that, at an intermediate position of the valve, communication is provided between the operating passage and both the power chamber and the accumulator; to provide a valve such that differential pressure areas thereof cause the valve to seek its normal or above mentioned first or non-parking position for isolating the accumulator chamber; to provide a valve which will be maintained in its second or parking position by a preponderance of fluid pressure in the operating passage to the braking mechanism over the fluid pressure in the power chamber; to provide a valve which will operate automatically to move from its second or parking position to its first or non-parking position in response to preponderance of pressure in the power chamber over pressure in the operating passage, whereby the operator may release the brake at the end of a parking period by merely pressing on the brake pedal of the braking system to momentarily create high pressure in the power chamber; to provide a simple and efficient valve suitable for manual closing by remote control; to provide a valve which, in closed position, that is, the parking position, is responsive to either fluid pressure in the power chamber or to fluid pressure in the brake system proper, so that whether or not the valve remains closed depends upon the pressure in the power chamber relative to pressure in the brake system, which relative pressure is in turn controlled by the brake pedal of the braking system; to provide a valve that either remains closed or fully opens with a snap action; and to provide a fluid-pressure responsive valve having pressure-differential surfaces to keep the valve from maintaining an intermediate position, the differential pressure exerted by the surrounding fluid serving to snap the valve open from any intermediate position so that the valve mechanism will normally remain in its first or non-parking position.

A further object of the invention is to provide an efficient valve construction, particularly in a three-way valve construction, which is adapted to be inserted into a suitable cylinder or bore and to be properly sealed within such cylinder or bore for adequate retention of the pressures required to be controlled.

Still another object is to provide a valve assembly of the indicated nature which requires at most only the following parts, all of which are adapted to be introduced into a cylindrical bore in a valve body; a barrel having at one end a valve seat, a poppet valve element having a stem extending through the barrel and having a head to engage the valve seat, a ring member to guide and pack the stem at one end of the barrel, a separate valve-seat member at the other end of the barrel, and packing means for the barrel, the separate seat member and the ring member.

Other objects and features of this invention will become apparent to those skilled in this art upon reference to the following specification and accompanying drawing.

This application is a continuation-in-part of my prior applications Serial Nos. 452,335, now Patent No. 2,467,887, 452,336, now Patent No. 2,427,669, and 485,464, now abandoned, filed respectively on July 25, 1942, July 25, 1942, and May 3, 1943.

In the drawing:

Fig. 1 is a longitudinal section through a preferred embodiment of the valve of this invention, it being shown in operative position within a valve body by which it is carried;

Fig. 2 is a side elevation of the principal members of the valve construction of Fig. 1, a portion being broken away to show the relationship of some of the parts;

Fig. 3 is a fragmentary elevational detail showing a slightly modified construction of the head of the poppet valve member of Figs. 1 and 2;

Fig. 4 is a longitudinal section showing a somewhat modified form of valve assembly;

Fig. 5 is a longitudinal section showing a further modified form of valve assembly; and Fig. 6 is an end elevation of the valve assembly of Figs. 1 and 2 as taken from the line 6—6 of Fig. 2.

Referring to the valve construction illustrated in Figs. 1 and 2, this preferred form comprises: a movable poppet valve member 10 having a valve stem 12 and a valve head 14; a continuous circular barrel 15 in which the valve member 10 is mounted; a packing body 16 which receives and packs one end of the valve stem 12; and a separate seat member 18 employed in conjunction with some uses of the valve structure for cooperation with the valve head 14 as seen in Fig. 1. The valve head 14 is conveniently provided with two frusto-conical faces 14a between which, at the region of their greatest diameter, is provided an annular groove 20 which receives a sealing ring 22 of rubber or similar material having an appropriate cross section, such as the square configuration shown, to engage a beveled valve seat 24 in the adjacent end of the barrel 15 and also to engage a similar valve seat 25 in the opposing portion of the separate seat member 18 when employed. In general, the seats 24 and 25 conform with the frusto-conical configuration of the faces 14a of the valve head 14. Thus, the valve stem 12 works in a chamber 26 within the barrel 15 and the valve head 14 works in a chamber 27 between the valve seats 24 and 25, the valve head 14 and its sealing ring 22 controlling the passage of fluid between the chamber 27 and radially disposed ports 28 provided in the barrel 15 and in communication with the chamber 26. The ports 28 lead to an annular groove 30 formed in the outer wall of the barrel 15. The side of the groove 30 remote from the valve seat 24 is defined by a circular end wall 31 of the barrel 15, the central portion of the end wall 31 bounding the corresponding end of the chamber 26 and being provided with a central passage which receives and guides the valve stem 12. At the opposite side of the groove 30 and spaced somewhat therefrom as shown, another annular groove 32 is provided (see Fig. 2), this groove receiving an annular rubber packing ring 33 which is conveniently circular in cross section and sufficiently deformable to possess proper packing qualities when the assembly is disposed in the bore of an appropriate valve body. Such packing rings are of the type commonly referred to as O-rings or donut packing rings.

Disposed against the end wall 31 is the packing body 16, it being also circular in shape to conform with any bore into which the barrel 15 is placed. This packing body is provided with a central passage for the reception of the valve stem 12, such passage being aligned with the corresponding passage in the end wall 31. In order to provide for the packing of the packing body 16 within any bore in which it is disposed, an annular shoulder 34 is formed in the side of the body 16 adjacent the end wall 31 whereby to receive an annular packing ring 35 like the packing ring 33. Also, the central portion of the body 16 is provided with a counter-bored groove 36, thereby forming an annular rib 37 which supports the packing ring 35 on its outer wall and receives against its inner wall an inner packing ring 38 in engagement with the valve stem 12. The packing ring 38, being deformable like the rings 33 and 35, thus serves to pack the stem 12 against loss of fluid through the corresponding opening in the center of the packing body 16.

In assemblies where the separate seat member 18 is required, this member is similarly packed within any bore which receives the assembly, this being accomplished by means of an annular packing ring 40 which may be constructed like the rings 33 and 35 and is disposed in a groove 42 in the outer wall of the seat member 18. As shown, the seat member 18 is provided with an integral, annular skirt 44 which, when the parts are assembled, abuts against the adjacent end of the barrel 15 at the periphery of the valve seat 24. This skirt 44 is provided with ports 45 for communication between the chamber 27 about the valve head 14 and an annular groove 46 in the outer wall of the seat member 18. The seat member 18 also is provided with a central passage 48 disposed axially with respect to the valve member 10 and its stem 12.

The valve assembly illustrated in Figs. 1 and 2, and above described, is so constructed as to be inserted in operative relationship into a cylindrical bore within an appropriate valve body 50 having pressure fluid passages through which the flow of fluid under pressure is to be controlled. In the particular embodiment shown, the valve body 50 has a passage 52 communicating with the annular groove 30 in the barrel 15 and leading to any appropriate source of fluid under pressure, such as a chamber 53 which may be an accumulator chamber of a hydraulic system. The valve body 50 is also shown as having a pressure fluid passage 54 leading to the annular groove 46 in the seat member 18 whereby to provide for fluid passage through the ports 45 into the chamber 27 about the valve head 14. In a situation where the seat member 18 is required for cooperation with the sealing ring 22 of the valve head 14, a passage 55 is employed in the valve body 50 to provide for communication between the aforesaid chamber 27 and any fluid supply means which may be a power chamber 56 of the mentioned hydraulic braking system. In such an instance, the passage 54 could be an operating passage leading to the brake mechanism. With such an arrangement it might sometimes be desirable to employ a spring 57 bearing at one end against an adjacent wall portion of the valve body 50 around the fluid passage 55 and at the other end against the outermost portion of the adjacent frusto-conical valve face 14a. In this instance an extension 12a on the valve 10 and aligned with the valve stem 12 may be employed for the purpose of centering such other end of the spring 57. Such a spring 57, when employed, would serve to provide a positive snap return action of the valve 10 to its open or normal position illustrated in Fig. 1.

Retention of the valve assembly in the valve body 50 may be insured by a retainer plate 58 secured in any appropriate manner to the valve body 50 and against the outer face of the packing body 16, whereby to retain the assembled valve parts in the contiguous relationships illustrated in Fig. 1. It will be appreciated that the valve body 50 having the cylinder in which the valve assembly is placed may be an integral portion of a casting also containing the mentioned pressure fluid chambers 53 and 56.

Under conditions like that illustrated in Fig. 1, the valve 10 is adapted to be moved from its normal, open position shown, to an opposite, closed position by any means manually or otherwise operated as required and represented by a bent lever 60 having an actuating nose 62 bearing upon the exposed outer extremity of the valve stem 12 which projects through the retainer plate 58 to the atmosphere. The bent lever 60 is conveniently mounted as by a fulcrum pin 63 carried in ears 64 provided upon the retainer plate 58.

A slight modification of the valve head 14 is shown in Fig. 3, this modification amounting to elimination of the frusto-conical valve face 14a adjacent the extension 12a. This form may be employed either in the assembly shown in Fig. 1 or in any arrangement which omits the seat member 18 or its equivalent.

With respect to the form of valve structure illustrated in Fig. 4, the construction is slightly modified to the extent that, instead of employing the sealing ring 22 on the valve head 14 and the valve seat 24 in the respective end of the barrel 15, an annular shoulder 70 is employed to serve as a valve seat and the respective frusto-conical face 14a serves as the sealing element to engage such valve seat. Similarly, a seating shoulder 72 is provided on the seat member 18 in place of the seat 25 of Fig. 1, such seating shoulder 72 being in turn engaged by the respective frusto-conical face 14a. As a further modification, the skirt 44 is integrally carried by the adjacent end of the barrel 15 instead of by the seat member 18. Otherwise, this construction is substantially the same as illustrated in Figs. 1 and 2.

In the modification illustrated in Fig. 5, the skirt 44 having the ports 45 again is carried by the respective end of the barrel 15, and the outermost frusto-conical face 14a of the valve head 14 engages with a narrow annular shoulder 74 of the separate valve seat member 18, such shoulder serving as a valve seat and being slightly beveled as indicated. The opposite side of the valve head 14 in this form is shown as being a radially flat annulus which seats upon a similarly radially flat annular seating shoulder 75. A further modification in this form is found in the nature of the packing body, which as illustrated, is in the form of an especially molded rubber cup-like packing ring 76 provided with an annular groove 76a into which there projects a circular skirt 77 against which the bottom of the ring 76 is sealed by reason of pressure imposed by a retainer plate 78 which may in general correspond with the retainer plate 58 of the other form. An inner flange-like member or packing ring 79 formed on the packing ring 76 by reason of the groove 76a serves adequately, in view of fluid pressure always present in the chamber 26, to pack against loss of fluid along the valve stem 12. Here, and in the other forms, the retainer plate 78 and other metallic members which pass the valve stem 12 provide a working fit at the central openings in which the valve stem 12 is received. If desired, appropriate parts may be formed from a fabric block and this is especially true of the separate seat member 18 in each form. As has been heretofore indicated, the spring 57 may or may not be used as required, its presence providing, however, for a more positive snap action should that be deemed necessary under any given working condition. Similarly, the necessity for the annular grooves 30 and 46 with which the ports 20 and 45 communicate will be dependent upon the disposition of passages which correspond with the passages 52 and 54 illustrated in Fig. 1.

In operation with the valve structures disclosed, it is normally intended that pressure exerted in the chamber 27 upon the respective frusto-conical valve face 14a will be relied upon to maintain the valve in its open or normal position illustrated in Fig. 1. In this case, fluid pressure applied through either of the passages 54 and 55 will accomplish the purpose. For example, in a braking system, fluid pressure produced in the power cylinder 56 and being transmitted through the passages 54 and 55 to the braking mechanism will maintain the valve 10 in the position illustrated where the valve body is seated against the valve seat 24 in the inner end of the barrel 15. This will be true, even as against a relatively high pressure in the accumulator chamber 53, because of the pressure differential resulting from the exposure of the outer end of the valve stem 12 to the atmosphere. When the valve 10 is shifted to the opposite position so that the valve head 14 is seated upon the valve seat 25 in the separate seat member 18 through actuation of the bent lever 60 and its operating nose 62, the pressure previously applied through the passage 54 will now be asserted upon the opposite side of the valve head 14, together with pressure applied from the accumulator chamber 53 through the passage 52 and the ports 28, and will maintain the valve 10 in such opposite position, which is its closed or parking position as these terms have been previously defined. Such position will be maintained, by reason of the pressures existing in the passages 52 and 54, upon release of some of the pressure in the power chamber 56 and so long as a predominating pressure is not restored to the chamber 56. To reverse the position of the parts, the bent lever 60 is released and a predominating pressure is built up in the power chamber 56, as by actuation of a brake pedal, to cause the valve 10 to shift.

Once the valve member 10 is unseated by predominating pressure applied through the passage 55 from the power cylinder 56, for example, and thereby moved to an intermediate position, the whole of the valve head 14 is acted upon the surrounding fluid. Since the opposite end of the valve stem 12 projects into the atmosphere, it is apparent that a pressure differential is effective upon the inner end of the valve head to urge the valve member with a snap action to its maximum open position or normal position. The pressure differential to produce such action is represented by the cross-sectional area of the valve stem 12, inasmuch as the cross-sectional area of the operative face of the valve head is correspondingly greater than the area of the opposite face of the valve head. Such differential is caused by reason of the fact that the surrounding pressure is usually relatively high and may be in the order of 700 pounds per square inch. The effect is the same whether the spring 57 is employed or not, and it occurs in all of the forms illustrated. When the spring 57 is employed, its value will be whatever is most beneficial in the particular system in which it is used.

As the valve stem 12 travels, it will be apparent that dislodgment of the inner packing ring 38 in the packing body 16 will be prevented by reason of the fact that the rib 37 is in contact with the end plate 31 of the barrel 15. Thus, the packing ring 38 insures against all loss of fluid around the valve stem 12, the packing ring 35 which engages the cylinder wall in the valve body 50 serving at the same time to prevent loss of fluid around the periphery of the packing body 16. Similarly, in the construction of Fig. 5, the outstanding wall portions of the packing ring 76 provided by the annular groove 76a serve to prevent loss of fluid along the valve stem 12 and the walls of the cylinder in the valve body 50.

Since other variations of the generic invention herein disclosed will become apparent to those skilled in this art, it is intended to cover all modification which fall within the scope of the claims.

I claim as my invention:

1. A valve construction comprising: a valve body having a bore; a valve comprising a valve head and a valve stem connected with said head; a rigid barrel insertable into said bore in said valve body, said barrel having a valve seat formed thereon at one end and said barrel having a passage therethrough to receive said stem, said barrel also providing a radially extending port; packing means disposed about said stem at one end of said barrel to pack said barrel in said bore and to pack said stem; and cover means directly attachable to said valve body and overlying said barrel and said packing means for said barrel and for said stem to retain said packing means and said barrel in said bore, said barrel having an end wall opposite from said valve seat, said valve stem extending through said end wall and said cover means, said packing means including a retainer between said end wall and said cover means, packing material held by said retainer adjacent said end wall to engage said valve body when inserted therein, and packing material held by said retainer adjacent said end wall and engaging said valve stem.

2. A valve construction as in claim 1 wherein said retainer is provided with concentric grooves, the outer of said grooves being disposed at the wall of said bore and containing the packing material to engage said valve body, and the inner of said grooves being disposed at said stem and containing the packing material engaging said stem.

3. In combination in a valve structure: a valve body having a valve bore with inner and outer ends and laterally extending ports leading from axially spaced points of said bore, said body having a port at the inner end of said bore; a barrel disposed in said bore and having an axial passage therethrough and having radial, axially spaced ports arranged to communicate with said ports of said valve body, and provided with a valve seat opposed to said port at said inner end of said bore, said valve seat being disposed between said ports of said barrel; a slidable valve having a valve head adapted to seat upon said seat and having a stem axially disposed in said passage; an end wall provided on the outer end of said barrel and provided with a passage through which said valve stem projects; a packing retainer disposed around said stem and bearing against the outer face of said end wall; packing means disposed in said packing retainer and in engagement with said valve stem to pack the same; annular packing means carried by said packing retainer in engagement with the inner wall of said bore; annular packing means disposed in an intermediate portion of the outer wall of said barrel and in engagement with said inner wall of said bore between said axially spaced ports in said barrel; a seat member disposed in said inner end of said bore between the inner end of said barrel and said port at said inner end of said bore and provided with a passage communicating with the last mentioned port, said seat member having a seat to be engaged by the adjacent end of said valve; annular packing means in the outer wall of said seat member and in engagement with the inner wall of said bore; and cover means carried by said valve body in engagement with said packing retainer, said valve stem projecting through said cover means to the exterior of said valve body.

4. In combination in a valve structure: a valve body having a bore; a rigid barrel disposed in said bore and having an axial passage therethrough, said barrel having a valve seat at the inner end thereof; a valve comprising a valve head adapted to seat on said valve seat and having a valve stem connected with said head and disposed in said passage, said valve barrel and said valve body having radial ports which are axially spaced on opposite sides of said seat; an end wall carried by the outer end of said barrel; a packing retainer provided with concentric grooves facing said end wall; holding means carried by said valve body and engaging and retaining said packing retainer, said end wall, retainer and holding means having passages through which said stem projects to the exterior of said valve body; annular packing means disposed in the inner of said concentric grooves in packing engagement with said valve stem; and annular packing means disposed in the outer of said concentric grooves in packing engagement with the inner wall of said bore.

JOHN N. GLADDEN.

References Cited in the file of this patent

UNITED STATES PATENTS

| Number | Name | Date |
|---|---|---|
| 717,292 | Shawver | Dec. 30, 1902 |
| 1,567,711 | Chase | Dec. 25, 1925 |
| 1,602,118 | Mortimer | Oct. 5, 1926 |
| 1,718,530 | Cook | June 25, 1929 |
| 1,720,197 | Ball | July 9, 1929 |
| 1,937,246 | Reedy | Nov. 28, 1933 |
| 1,972,821 | Weatherhead | Sept. 4, 1934 |
| 2,071,390 | Crowell | Feb. 23, 1937 |
| 2,071,391 | Crowell | Feb. 23, 1937 |
| 2,089,279 | Loeffler | Aug. 10, 1937 |
| 2,397,117 | Ashton | Mar. 26, 1946 |
| 2,417,494 | Hoof | Mar. 18, 1947 |

FOREIGN PATENTS

| Number | Country | Date |
|---|---|---|
| 33,331 | Denmark | of 1929 |